(12) United States Patent
Lambert et al.

(10) Patent No.: US 9,794,871 B2
(45) Date of Patent: Oct. 17, 2017

(54) REMOTELY REPROVISIONING A DEVICE TO A NEW SERVICE PROVIDER BY UPDATING AN EMBEDDED SUBSCRIBER IDENTIFIER MODULE (SIM)

(71) Applicant: GCI Communication Corp., Anchorage, AK (US)

(72) Inventors: Sean Lambert, Littleton, CO (US);
Wendy Gonzalez, Los Gatos, CA (US);
Mark Doyle, Portland, OR (US)

(73) Assignee: GCI Communication Corp., Anchorage, AK (US)

( * ) Notice: Subject to any disclaimer, the term of this patent is extended or adjusted under 35 U.S.C. 154(b) by 0 days.

(21) Appl. No.: 14/588,305

(22) Filed: Dec. 31, 2014

(65) Prior Publication Data
US 2016/0192312 A1     Jun. 30, 2016

(51) Int. Cl.
*H04W 4/00* (2009.01)
*H04W 48/18* (2009.01)
*H04W 8/20* (2009.01)

(52) U.S. Cl.
CPC .............. *H04W 48/18* (2013.01); *H04W 8/20* (2013.01)

(58) Field of Classification Search
CPC .................................................... H04W 60/04
See application file for complete search history.

(56) References Cited

U.S. PATENT DOCUMENTS

2013/0132854 A1* 5/2013 Raleigh ................ G06F 3/0482
                                                                    715/738

* cited by examiner

*Primary Examiner* — Idowu O Osifade
(74) *Attorney, Agent, or Firm* — Lee & Hayes, PLLC

(57) ABSTRACT

A provisioning server may select a new service provider to provide network connectivity to a network-enabled device in response to a determination that the device has moved to a new region that is different than a home region. The provisioning server may automatically determine whether to cause the device to switch service providers with little or no input by a user or an administrator of the device. The provisioning server may select a new service provider from various available service providers based at least partly on a profile associated with the device. A provisioning server may enable access by the device to the selected service provider by causing an update to an embedded SIM of the device. In this way, the provisioning server may update connectivity of the device to a new service provider with little or no human input, thereby simplifying management of the device.

20 Claims, 7 Drawing Sheets

REMOTELY REPROVISIONING A DEVICE TO A NEW SERVICE PROVIDER BY UPDATING AN EMBEDDED SUBSCRIBER IDENTIFIER MODULE (SIM)

BACKGROUND

Network-enabled computing devices have become commonplace in almost every environment. Mobile telephones, laptop computers, and tablet computers are commonly used for work and pleasure and accompany people in many daily activities. For example, people often travel with network-enabled computing devices. In addition, other types of network-enabled computing devices exchange information via networks, such as smart parking meters, animal tracking devices, vehicle systems, health monitors, and other network-enabled devices that may be moved to different locations.

Many of these devices utilize an embedded Subscriber Identifier Module (SIM), which is typically implemented as an integrated circuit that securely stores information to enable connectivity of a device to a network, such as a mobile telephone network (MTN) or other type of network. The embedded SIM allows reconfiguration of identification information, thereby allowing an associated device to connect to a different network without physical replacement of the SIM. In some instances, the device may be updated to operate or communicate with a different service provider, which is typically selected by an administrator (e.g., user, manager, etc.) of the device. Many different service providers exist, each offering various plans having relative complexity. Therefore, the selection of a new service provider and corresponding service plan can be a difficult process that is often time consuming and distracting to the administrator.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
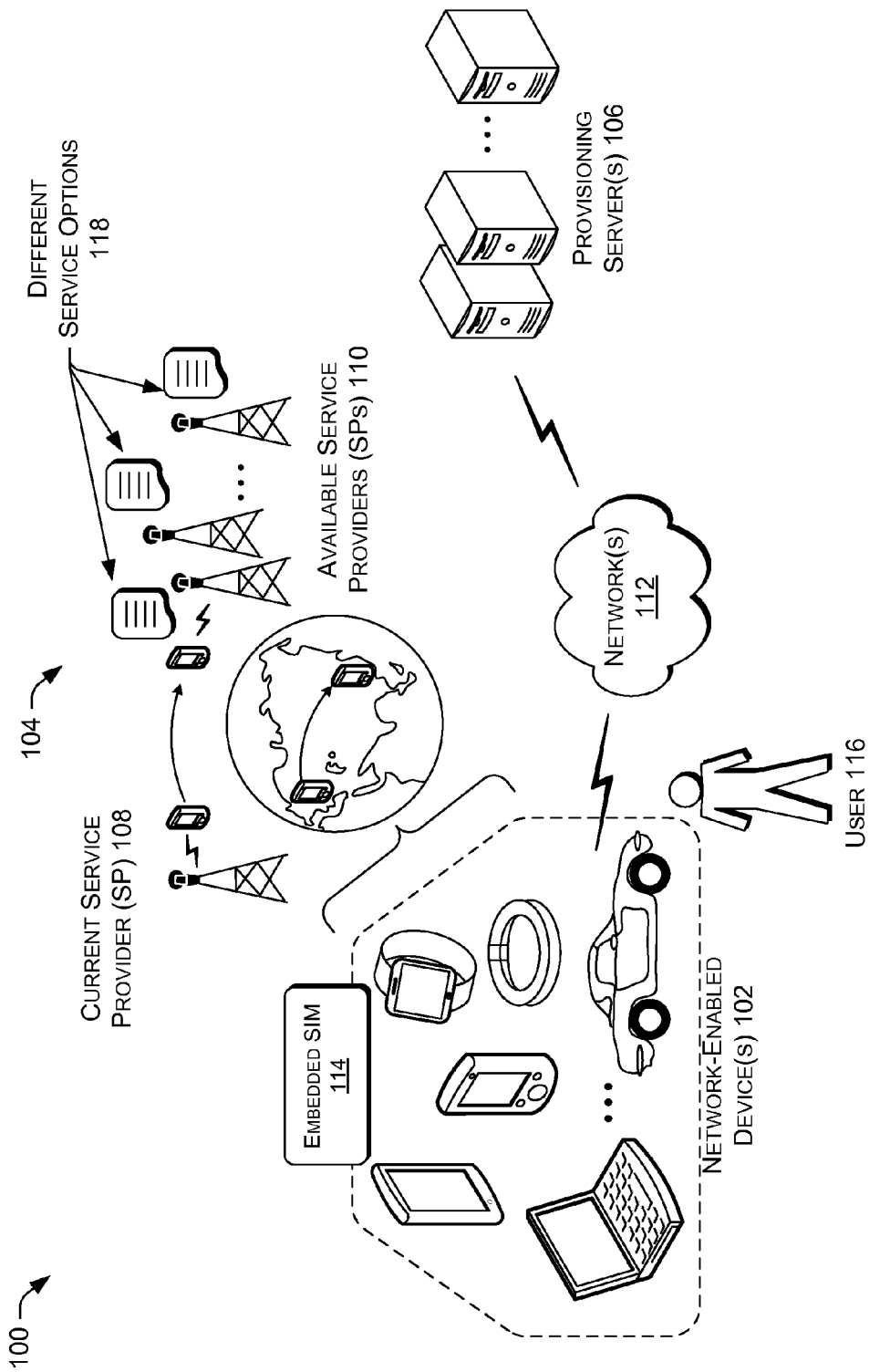
FIG. 1 is a schematic diagram of an illustrative computing environment that includes a device, multiple service providers, and a provisioning server that facilitates remote subscription management.

This disclosure is directed at least partly to selecting a new service provider to provide network connectivity to a network-enabled device in response to a determination that the device has moved to a new region that is different than a home region serviced by a current service provider. The new region may be serviced by at least some service providers that are different than service providers that provide service in the home region. In some instances, the device may maintain connectivity through the current service provider, but may be charged additional fees (e.g., roaming fees) and/or may experience reduced network reliability, reduced coverage, and/or reduced operational features. For example, when roaming, a device may experience reduced performance due to prioritization of the service provider that facilitates the roaming.

The disclosure includes techniques to automatically determine whether to cause the device to switch service providers without input by an administrator (e.g., the user of the device, the owner of the device, etc.). The disclosure further includes techniques to select a new service provider from various available service providers based on of a profile of the user/device, which may indicate preferences, an expected duration of the device in the new region, and/or other factors. A provisioning server may select the new service provider and enable access by the device to the new service provider, such as by causing an update to an embedded SIM of the device. In this way, the provisioning server may update connectivity of the device to a new service provider with little or no human input, thereby simplifying management of the device while more efficiently creating or maintaining network connectivity of the device.

As an example, a user may travel with her device (e.g., a mobile telephone) to a different country. After the user turns on her device in the new country, the device may transmit a message directly or indirectly to a provisioning server that may determine and select a new service provider for the device in the new country. The provisioning server may then cause update of an embedded SIM in the device so that the user can use her mobile telephone in the new country. The provisioning server will select a service provider based on an expected use of the device in the new country, which may be predicted using a profile generated for the user. Other devices may also be provisioned when relocated to a new region or country, such as a vehicle communication system after the vehicle is relocated to the new region or country, possibly by being driven there by its owner.

As another example, a non-user-facing device, such as an animal tracking device may move to a new region, possibly by movement of the animal or shipment of an animal The provisioning server may determine and select a new service provider for the device in the new region. The provisioning server may then cause update of an embedded SIM in the device so that the device has connectivity in the new region with a service provider that provides ideal communication service to the device. The provisioning server will select a service provider based on an expected use of the device in the new region, which may be predicted using a profile generated for the device. Other examples of non-user-facing devices are machine-to-machine devices that communicate with other machines rather than directly to users that control the device. This class of devices may also include the Internet of Things (IOT), which may include health monitoring systems or other monitoring devices, payment devices, transport devices, and so forth.

An administrator of a device may authorize the provisioning server to perform the provisioning on behalf of the administrator, which may include initiating a service contract with new service provider and/or other proceedings that occur when a new service provider is selected and retained to provide network connectivity for a device.

The techniques and systems described herein may be implemented in a number of ways. Example implementations are provided below with reference to the following figures.

FIG. 1 is a schematic diagram of an illustrative computing environment 100 that includes a network-enabled device ("device") 102, multiple service providers 104, and a provisioning server 106 that facilitates remote subscription management of the device 102. The provisioning server 106 may be authorized by an administrator of the device 102 to perform remote subscription management of the device 102, which may include selecting a new service provider for the device 102 and causing the device 102 to be configured to enable communications with the new service provider.

As shown in FIG. 1, the device 102 may be moved from a current region associated with a current service provider 108 to a new region associated with available service providers 110. The provisioning server 106 may detect the change in the region by the device 102, such as via an exchange of data via a network 112, via global position system (GPS) data, or by other data.

In accordance with one or more embodiments, the provisioning server 106 may select one of the available service providers 110 based on historical information about the device 102, information about a user 116 of the device 102 (if a user is associated with the device), a profile associated with the device, and/or other factors. The provisioning server 106 may cause the device to automatically update an embedded Subscriber Identifier Module (SIM) 114 to enable connectivity with a selected one of the available service providers 110.

The devices 102 may include user devices, such as mobile telephones, portable computers, wearable devices, and so forth. The devices 102 may include non-user facing devices capable of relocation, which may not be associated with a user, such as vehicles, tracking devices (e.g. animal tracking devices), manufacturing equipment, billing devices (e.g., electronic parking meters, cash registers, etc.), and/or other machines having network connectivity. These devices are sometimes collectively referred to as part of the Internet of Things (IOT).

When a device is moved from a current location/region to a new location/region, the device 102 may transmit a signal or notification directly or indirectly to the provisioning server 106. The provisioning server 106 may then take one or more actions, described herein, to enable connectivity of the device 102 to one of the available service providers 110 in the new location/region. In some instances, the provisioning server 106 may determine to have the device 102 maintain the relationship with the current service provider 108, which may result in roaming charges. In some instances, the provisioning server 106 may cause the device 102 to update a service provider, at least temporarily, by causing the embedded SIM 114 of the device 102 to be updated to enable connectivity with one of the available service providers 110.

The available service providers 110 may each have different service options 118. The service options may include different costs (e.g., peak, non-peak, voice, data, bandwidth, etc.), different coverage, different reliability rates, different services (e.g., data, voice, software, etc.), and so forth. Thus, selection amongst the available service providers 110 by the provisioning server 106 includes consideration and selection of a service option for a selected service provider. The service provider and service option may be automatically selected by the provisioning server 106 based on various data associated with the device 102 and/or the user 116, as discussed above and in more detail below.

By performing the provisioning of the device 102 by the provisioning server 106, the device 102 obtain connectivity with a service provider that is best suited to provide service (connectivity, features, etc.) to the device 102 without causing the user 116 or an administrator of the device 102 to perform research, make decisions, and/or take other actions to update a server provider of the device 102. The device 102 may also be updated faster and with little or no human input.

Figure 2:
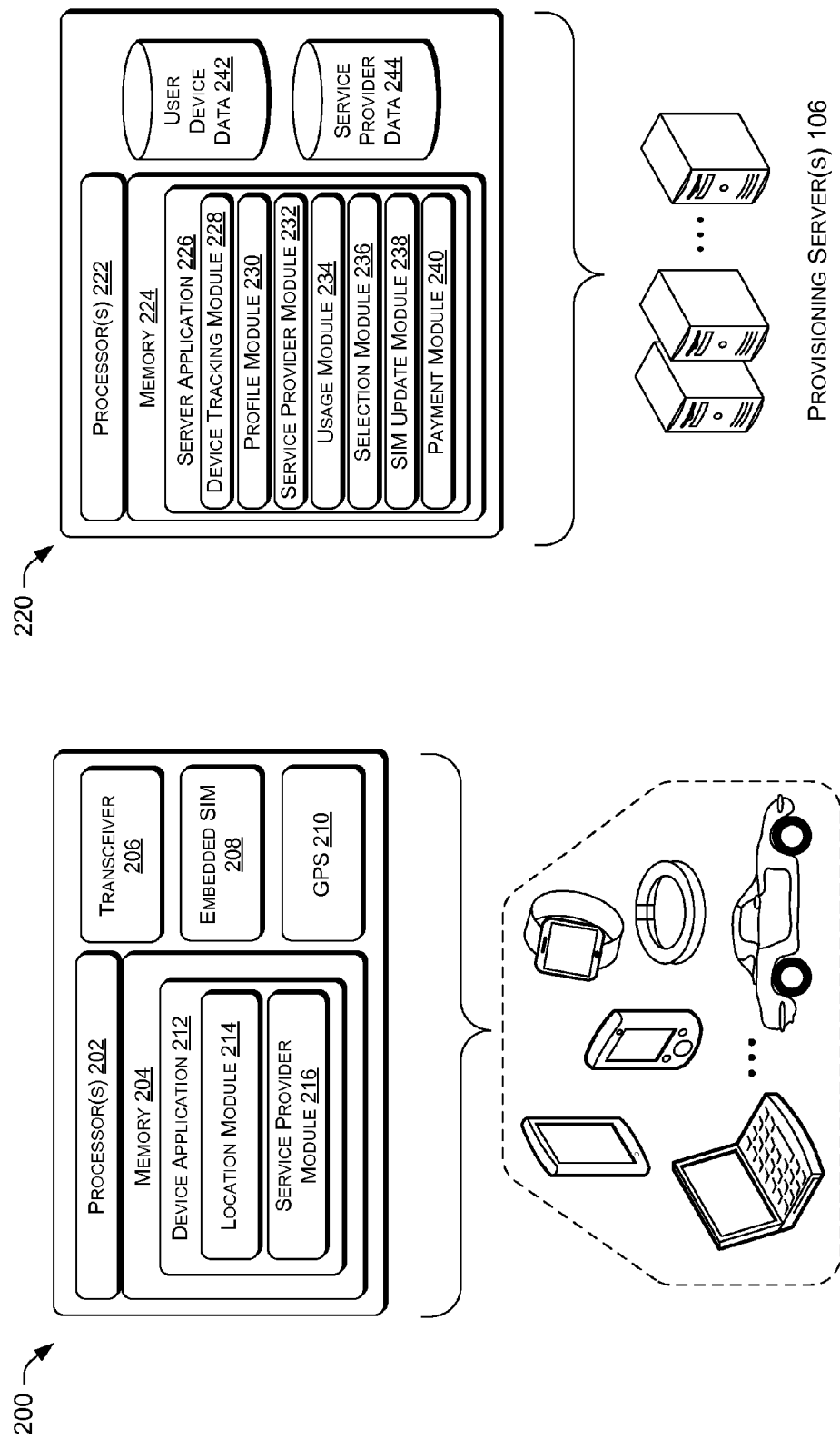
FIG. 2A is a block diagram of illustrative computing architecture of the device.
FIG. 2B is a block diagram of illustrative computing architecture of the provisioning server.

FIG. 2A is a block diagram of illustrative computing architecture of the device 102. The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the device 102. The computing architecture may also include a transceiver 206, an embedded SIM 208 (which may be the same as the embedded SIM 114), and/or a global positioning system (GPS) 210. Other component may also be included in the computing architecture depending on the type of the device 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, DD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. In some embodiments, the computer-readable media 204 may store a device application 212 that includes at least a location module 214 and a service provider module 216, each described in turn.

The location module 214 may determine a location of the device 102. The location module 214 may determine that the device 102 has been deployed in a region different than a home region. For example, when the device 102 is transported from the United States to Europe, the device 102 may require access to a different service provider. The location module 214 may determine the change in region or location based on GPS data from the GPS 210, based on a mobile network identification or other data received from a service provider (e.g., identifiers of available service providers, etc.), and/or using other known techniques. The location module 214 may cause transmission of the location/region information to the provisioning server 106.

The service provider module 216 may configure access to a service provider at least partially through use of the transceiver 206 and the embedded SIM 208. The service provider module 216 may receive or exchange information with the provisioning server 106, such as instructions to update the embedded SIM 208. In some embodiments, the service provider module 216 may update the embedded SIM based on information from the provisioning server 106 to enable connectivity with a new service provider. The service provider module 216 may implement various rules that manage use and/or update of the embedded SIM based on communications with the provisioning server 106. In some embodiments, the service provider module 216 may store and/or implement different profiles and/or different configurations for the embedded SIM 208. For example, when a configuration of the embedded SIM 208 is to be updated, the service provider module 216 may save a prior configuration of the embedded SIM for future use, such as to reconfigure the embedded SIM to work with a prior service provider (e.g., after the device returns to a prior region).

FIG. 2B is a block diagram of illustrative computing architecture 220 of the provisioning server 106. The computing architecture 220 may be implemented in a distributed computing environment (e.g., cloud services, wide area network, etc.) or non-distributed computing environment.

The computing architecture 220 may include one or more processors 222 and one or more computer readable media 224 that stores various modules, applications, programs, or other data. The computer-readable media 224 may include instructions that, when executed by the one or more processors 222, cause the processors to perform the operations described herein for the provisioning server 106.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 224 may store a server application 226, which may include a device tracking module 228, a profile module 230, a service provider module 232, a usage module 234, a selection module 236, a SIM update module 238, and a payment module 240, which are described in turn. The components may be stored together or in a distributed arrangement. More of fewer components may be used. In addition, the provisioning server 106 may populate, maintain, and/or access user device data 242 and/or service provider data 244 as discussed below.

The device tracking module 228 may track a location and/or region associated with the device 102. A new region may be defined based on offerings by service providers. For example, the device may be determined to be located in a new region when at least one different service provider is available to provide service to the device 102. The device tracking module 228 may receive input from the location module 214 of the device 102 to enable the tracking. The device tracking module 228 may associate that location/region with various service providers located in the location/region. In some embodiments, the device tracking module 228 may designate different regions associated with the device 102, such as a home region, a work region, a primary region, a secondary region, a travel region, a temporary region, and so forth. This may enable reverting back to a prior configuration associated with a previous location/region.

The profile module 230 may create, modify, and/or implement profiles for the device 102 and/or the user 116. The profile module 230 may generate and/or access the user device data 242 to determine historical information about use of the device 102 and/or use by the user 116. For example, the historical use may include voice calls in various locations over time, data usage in various locations over time, amounts of data downloaded/uploaded, and so forth. The profile module 230 may analyze this data to predict future usage of the device, such as use of the device in other regions that are different from a home/primary region. For example, the profile module 230 may determine if the device 102 is used heavily, moderately, or modestly used when traveling, possibly for each of data usage and voice call usage. The profile module 230 may then aggregate information that can be used to determine which service provider and/or which service options are best suited for a device/user when the device is relocated to a different region having different service providers. The service profile may also store travel trends, such as an average length of stay when the device/user are traveling. This information may be used to determine whether or not to enable roaming, when roaming is possible. For example, when the location in a new region is predicted to be short (e.g., a quick vacation) based on the profile, then roaming may be a cost effective option. In various embodiments, the profile module 230 may accept direct input of information (e.g., use preferences). In some embodiments, the profile module 230 may associate a profile with a different user based on a likeness of the user 116 with another user and/or associate the profile with a different device based at least partly on a likeness of the device 102 with another device (e.g., another smart phone that accesses a large amount of data, etc.).

The service provider module 232 may determine information about available service providers associated with different regions/locations. The service provider module 232 may determine different service options for each service provider, such as costs for different amounts of data, voice calls, and/or other services. The service provider module 232 may store information on coverage (e.g., coverage maps) for service providers, as well as track reliability, possibly through customer feedback, errors, and/or dropped calls. The service provider module 232 may track costs associated with roaming for service providers. By collecting and maintaining this information, the service provider module 232 may enable automated decision making about whether to switch service providers or roam, and which service provider and service option to select if a switch is service provider is implemented. The service provider module 232 may intact with information in the service provider data 244, such as by storing information, collecting information, modifying information, and/or accessing information.

The usage module 234 may track historical usage of the device 102 and/or user 116 and predict future usage by the device 102 and/or the user 116 in a new region. For example, the usage module 234 may predict, based at least in part on information from the profile module 230, a length of stay in a region and an amount of usage in that region. The usage module 234 may then track the actual usage in the new region for comparison purposes and/or for other purposes such as those discussed with reference to FIG. 7.

The selection module 236 may select a new service provider or determine to cause the device 102 to roam based at least on information from the profile module 230, the service provider module 232, and the usage module 234. The selection module may cause the device 102 to update the embedded SIM 208 via the service provider module 216 to enable access to a new and different service provider. The selection module 236 may select a new service provider that is best tailored for a user/device based on the profile, such as a service provider with a preferred cost, reliability, coverage, data speed, and/or combination thereof. For example, if a device is associated with heavy data use, the selection module may select a service provider with high data speeds at a price point that is advantageous for the device/user. If the profile indicates that coverage is a high priority, the selection module 236 may weigh coverage metrics of a service provide more heavily than cost metrics when selecting the service provider. In some embodiments, the selection module 236 may notify the user 116 of a change to the service provider, such as by transmitting a message to the user (e.g., a text message, a user interface/system message, etc.).

The SIM update module 238 may cause the device 102 to update the embedded SIM 208. In some embodiments, the SIM update module 238 may transmit a message to the service provider module 216 to cause the service provider module 216 to perform the update to the embedded SIM 208.

The payment module 240 may transmit a reimbursement to the user 116 in some instances when the selection module 236 selects a service provider that ends up costing the user more than another service provider or when a decision to enable roaming ends up costing the user more than another service provider. The reimbursement may be a partial different of a cost difference between different service providers and/or service options. The provisioning server 106 may offset this reimbursement using savings from negotiated volume discounts obtained by the provisioning server 106, for example.

FIGS. 3-5 and 7 show processes illustrated as a collection of blocks in a logical flow graph, which represent a sequence of operations that can be implemented in hardware, software, or a combination thereof. In some instances, the collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, some operations may be omitted.

Figure 3:
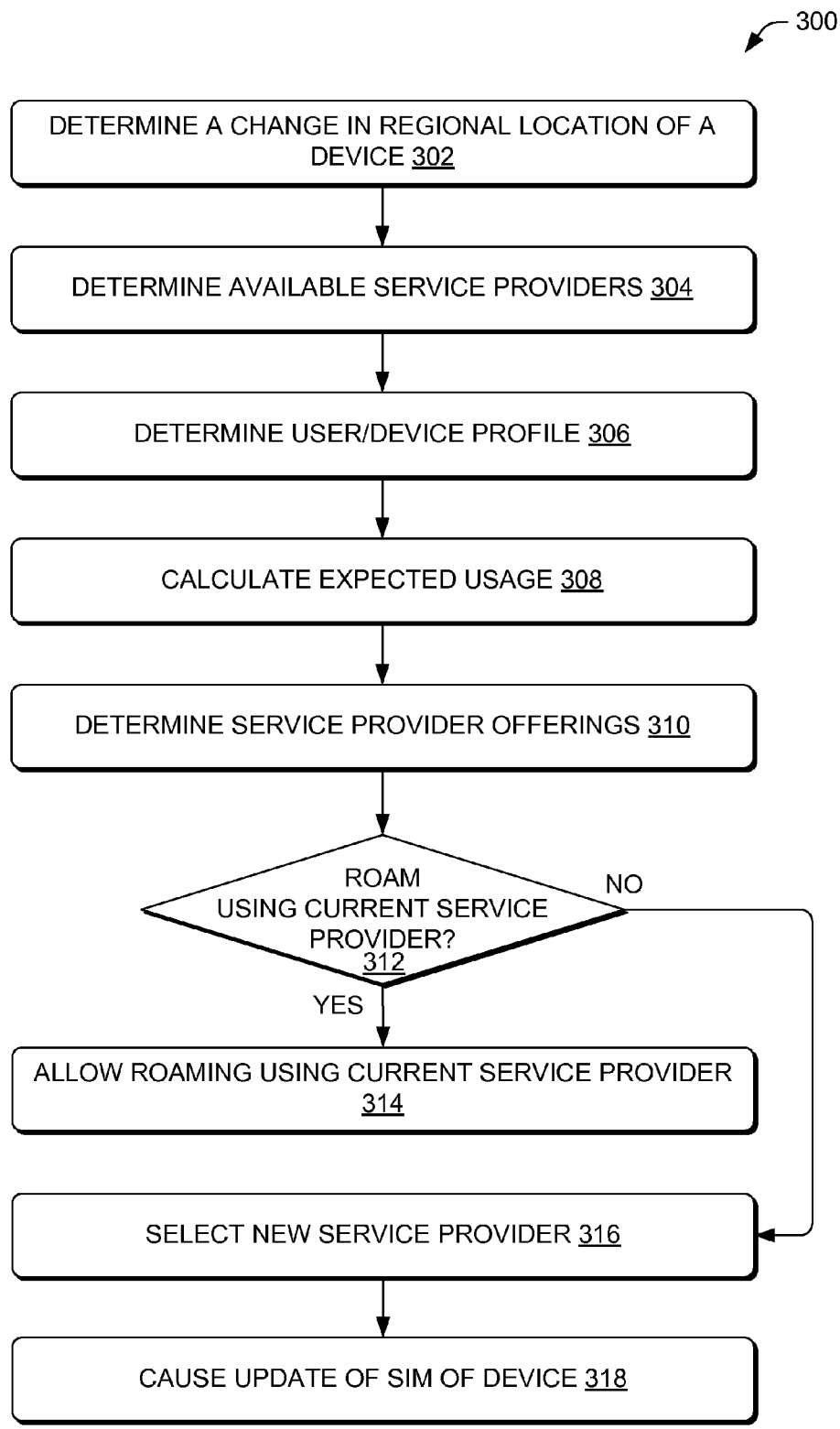
FIG. 3 is a flow diagram of an illustrative process to determine a change in a regional location of a device and then determine whether to update a service provider associated with the device via update of an embedded SIM of the device.

FIG. 3 is a flow diagram of an illustrative process 300 to determine a change in a regional location of a device and then determine whether to update a service provider associated with the device via update of an embedded SIM. The process 300 is described with reference to the environment 100 and computing architectures shown in FIGS. 2A and 2B. The process 300 is described as being performed by the provisioning server 106, but may be performed at least partly by other devices.

At 302, the device tracking module 228 may determine a change in a regional location of a device, such as the device 102. The device tracking module 228 may determine the change based on information received from the device 102 (e.g., via the location module 214). The location information may be analyzed to determine whether a new service provider may be selected and/or whether the device may be subject to roaming charges. For example, the device tracking module 228 may receive GPS location data, and use that GPS location to associate a region with the device, which may be different than a home/default region, and may have at least one different service provider available than in the home/default region.

At 304, the service provider module 232 may determine available service providers in the location/region determined at the operation 302, possibly using the service provider data 244. In some embodiments, the available service providers may be determined at least partly from information received from the device 102, such as service providers that are currently accessible to the device 102 in the new location/region. In various embodiments, at least some of the available service providers may be determined by the provisioning server 106.

At 306, the profile module 230 may determine a profile for the device 102 and/or for the user 116, possibly using the user device data 242. The profile may be created or retrieved by the profile module 230, such as when a profile already exists for the user and/or device. The profile may be used to select a new service provider, or determine to roam using a current service provider, based at least partly on historical use, user preferences, and/or other information about the user/device. In some embodiments, the profile may be a generic default profile, a profile selected from various different generic profiles (e.g., business traveler, vacationer, etc.), and/or a profile adapted from another user or another device.

At 308, the usage module 234 may calculate expected usage by the device 102 in the new region. The usage module 234 may make the calculation based on historical use, possibly using the profile. For example, if the user is visiting Hawaii and has visited Hawaii in the past for an average of one week per visit, the usage module may predict that the expected usage will be about one week in length and similar to previous usage when located in Hawaii. If the user visits Fiji, the profile may associate usage patterns from Hawaii, for example. The usage module 234 may make other inferences, such as by comparing the user to other users and/or the device to other devices to predict expected usage (e.g., pulling data from similarly situated users/devices). In some embodiments, the expected usage may be input by a human, such as the user 116 or an administrator.

At 310, the service provider module 232 may determine service provider offering in the new region, possibly using the service provider data 244 and/or the data determined at the operation 304. For example, the service provider module 232 may determine service options, such as rate plans, special services, and so forth available for each service provider.

At 312, the selection module 236 may determine whether to allow the device to roam using a current service provider (when that option is possible) or to select a new service provider. The selection module 236 may make the determination based on the inputs from at least the operations 308 and 310 in order to maximize value for the user/device based on metrics indicated in the profile, such as by minimizing cost, maximizing coverage, maximizing speed, or some variation thereof. When the selection module 236 determines to allow roaming (following the "yes" route from the decision operation 312), then the process 300 may continue at an operation 314.

At 314, the selection module 236 may allow roaming using a current service provider. For example, the selection module 236 may take no action or may send a message to the device 102 confirming no change to the service provider or possibly instructing the device to authorize roaming.

When the selection module 236 determines not to allow roaming (following the "no" route from the decision operation 312), then the process 300 may continue at an operation 316. At 316, the selection module 236 may select a new service provider for use by the device/user. The selection module 236 may make the selection of the new service provider based on the inputs from at least the operations 308 and 310 in order to maximize value for the user/device based on metrics from the profile, such as by minimizing cost, maximizing coverage, maximizing speed, or some variation thereof. In some embodiments, the selection module 236 may select a previous service provider associated with the device, such as when the device returns to a known region (e.g., returns home from vacation or a work trip). The selection of the new service provider may include enter a subscription agreement and other formal requirements, or having such requirements directed to the user 116 and/or an administrator for processing.

At 318, the SIM update module 238 may cause an update of the embedded SIM 208 of the device 102 to enable connectivity to the new service provided selected at the operation 316. The selection module 236 may transmit a message to the user/device to indicate a change in the service provider and/or terms associated with a new service option/plan.

Figure 4:
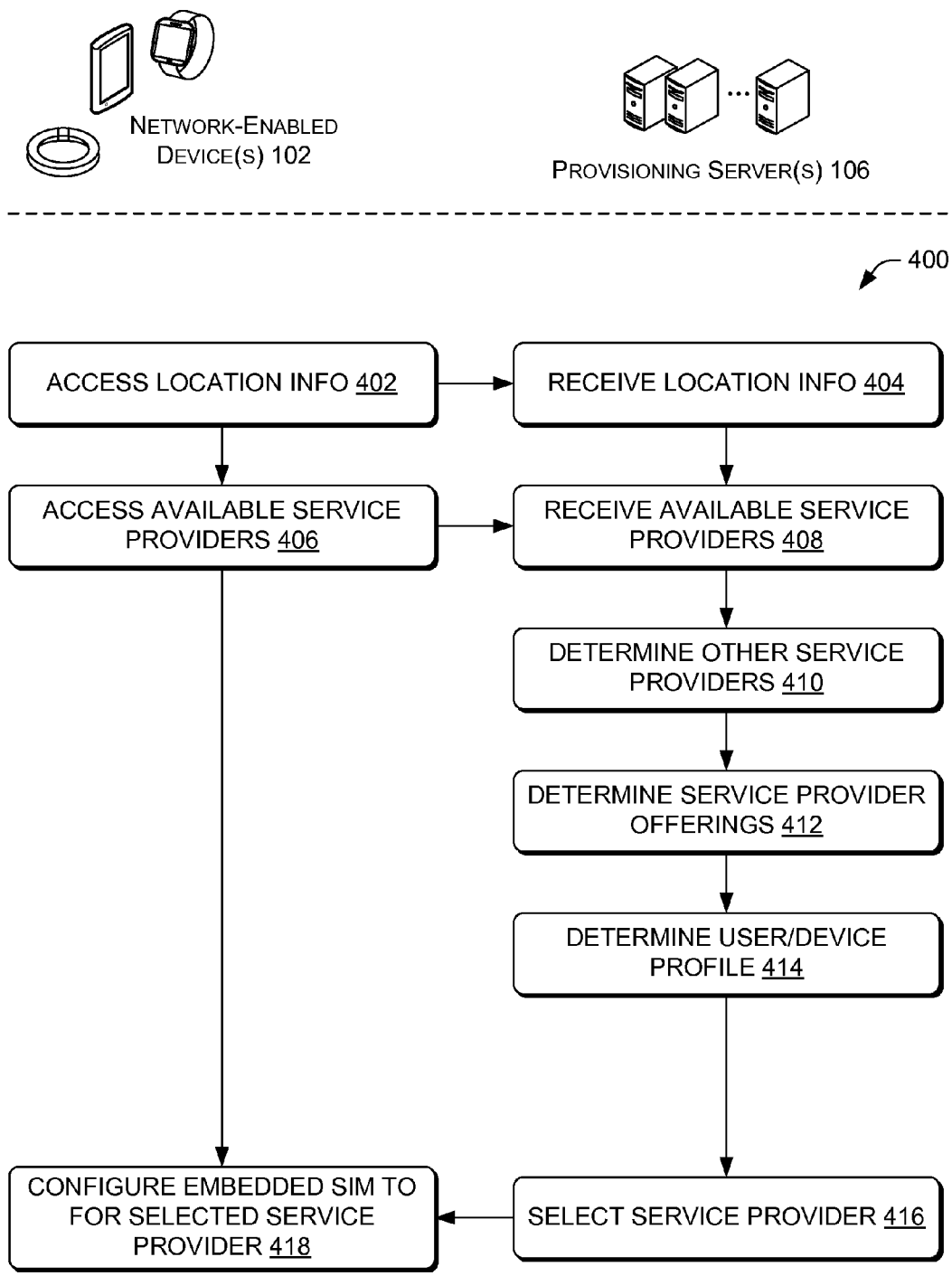
FIG. 4 is a flow diagram of an illustrative process of updating an embedded SIM of a device to gain connectivity to a service provider selected for the device.

FIG. 4 is a flow diagram of an illustrative process 400 of updating an embedded SIM of a device to gain connectivity to a service provider selected for the device. The process 400 is described with reference to the environment 100 and computing architectures shown in FIGS. 2A and 2B. The collection of blocks is organized under respective entities that may perform the various operations described in the blocks; however, other entities may perform some of the operations.

At 402, the device 102 may access location information. The device may access location information using the GPS 210, using the transceiver (e.g., pinging service providers, etc.), and/or by other known techniques. The provisioning server 106 may receive the location information at 404. The location information may be a pinpoint location, a country code, a mobile network identifier, a regional identifier, and/or other information that locations the device relative to available service providers.

At 406, the device 102 may access available service providers at the new location. For example, the transceiver 206 may obtain identification information for service providers that communicate with the device, when available. The device 102 may transmit any known information about available service providers at the new location to the provisioning server 106, for receipt by the provisioning server 106 at 408.

At 410, the provisioning server 106, possibly via the service provider module 232, may determine other service providers that may be available to provide network communication services to the device 102, such as by querying the service provider data 244.

At 412, the provisioning server 106, possibly via the service provider module 232, may determine offerings (e.g., plans, performance, etc.) of the service providers identified in the operations 408 and 410. The offerings may be retrieved from the service provider data 244.

At 414, the provisioning server 106, possibly via the profile module 230, may determine a profile for the user/device. This operation may be similar to the operation 306 discussed with reference to the process 300.

At 416, the provisioning server 106, possibly via the selection module 236, may select a new service provider from the available service providers identified in the operations 408 and 410. The selection module 236 may make the selection based at least in part on the provider offerings determined at the operation 412 and the profile determined at the operation 414. For example, the selection module 236 may make the selection of the new service provider in order to maximize value for the user/device based on metrics from the profile, such as by minimizing cost, maximizing coverage, maximizing speed, or some variation thereof. In some embodiments, the selection may still include roaming charges. The selection at the operation 416 may be transmitted from the provisioning server 106 to the device 102.

At 418, the device may receive the selection of the new service provider and/or information to update the embedded SIM 208. The device 102, possibly via the service provider module 216, may update the embedded SIM to enable connectivity to the new service provider selected at the operation 416.

Figure 5:
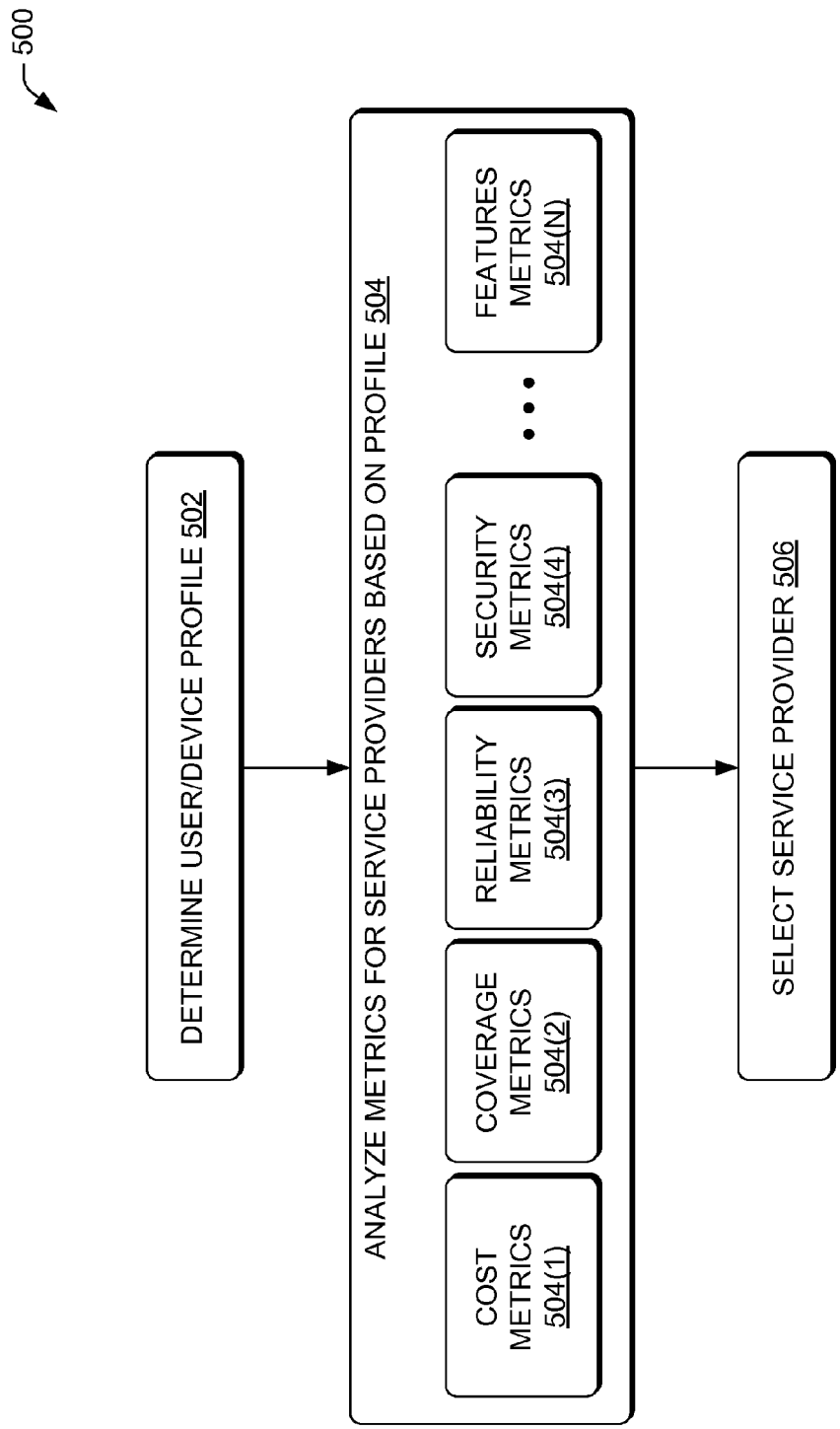
FIG. 5 is a flow diagram of an illustrative process to analyze various metrics associated with a user and/or device, which are used to select a new service provider.

FIG. 5 is a flow diagram of an illustrative process 500 to analyze various metrics associated with a user and/or device, which are used to select a new service provider. The process 500 is described with reference to the environment 100 and computing architectures shown in FIGS. 2A and 2B. The process 500 may be performed by the provisioning server 106.

At 502, the profile module 230 may determine a profile for the user 116 and/or device 102, possibly using the user device data 242. The profile may be created or retrieved by the profile module 230, such as when a profile already exists for the user and/or device. In some embodiments, the profile may be a generic default profile, a profile selected from various different generic profiles (e.g., business traveler, vacationer, etc.), or a profile adapted from another user or another device.

At 504, the selection module 236 may analyze metrics for service providers, which may be stored in the service provider data 244, based on the profile from the operation 502. The selection module 236 may analyze at least one of cost metrics 504(1), coverage metrics 504(2), reliability metrics 504(3), security metrics 504(4), feature metrics 504(N) and/or other relevant metrics that relate to data included in the profile.

The cost metrics 504(1) may include analysis of any fixed fees associated with a service provider, such initiation fees. The cost metrics 504(1) may include determination of peak versus non-peak usage, where some types of operation may be pushed to non-peak times such as batch processing of data to upload from a device to a server. In some instances, the provisioning server 106 may negotiate volume discounts when the provisioning server is able to provision many devices to a particular service provider. As discussed below with reference to FIG. 7, such discounts could be used to offset inaccurate predictions on use of some of the devices, which may be at least partially remedied by way of reimbursements or partial reimbursements.

As an example, when the profile indicates that cost is an important factor in determining the service provider, the analysis may focus on the cost metrics 504(1), which may include costs for different service plans offered by various service providers. In some instances, the feature metrics 504(N) may be a highly weighted consideration, such as whether a particular service provider includes specific service (e.g., data at a threshold transmission speed, customer support, etc.). Thus, a metric may be used in combination with one or more other metrics. The coverage metrics 504(2) may include a coverage map associated with each service provider. The coverage map may include data representative of coverage for different types of device, different types of terrain, and/or specific information for a location or type of location. The reliability metrics 504(3) may indicate reliability of services provided by each service provider. For example, the reliability metrics 504(3) may indicate a frequency of dropped calls, failed data transmissions, errors in data transmissions, bandwidth falling below a threshold, user reviews, and/or other reliability metrics. The security metrics 504(4) may indicate a security level associated with a service provider and/or a service plan. In some instances, the security metrics 504(4) may indicate at least one of security breaches experienced by the service provider, authentication protocols used by the service provider, and/or other security information used in establishing and maintaining secure voice and/or data connections during interaction with a service provider.

In some embodiments, the metrics 504(1)-(N) may be at least in part updated and/or maintained by the provisioning server. For example, the provisioning server 106 may test aspects of the operations performed by the service providers, monitor data for devices that interact with the service providers, and/or query data associated with performance of the service providers. The provisioning server 106 may aggregate this information to generate and/or update the respective metrics discussed above.

At 506, the selection module 236 may select a new service provider for use by the client device 102 based on the profile from the operation 502 and the metrics from the operation 504. For example, the selection module may use a scoring and/or weighting algorithm to systematically determine a best match of a service provider and a service plan for the device based on the profile associated with the device 102 or user of the device 116.

Figure 6:
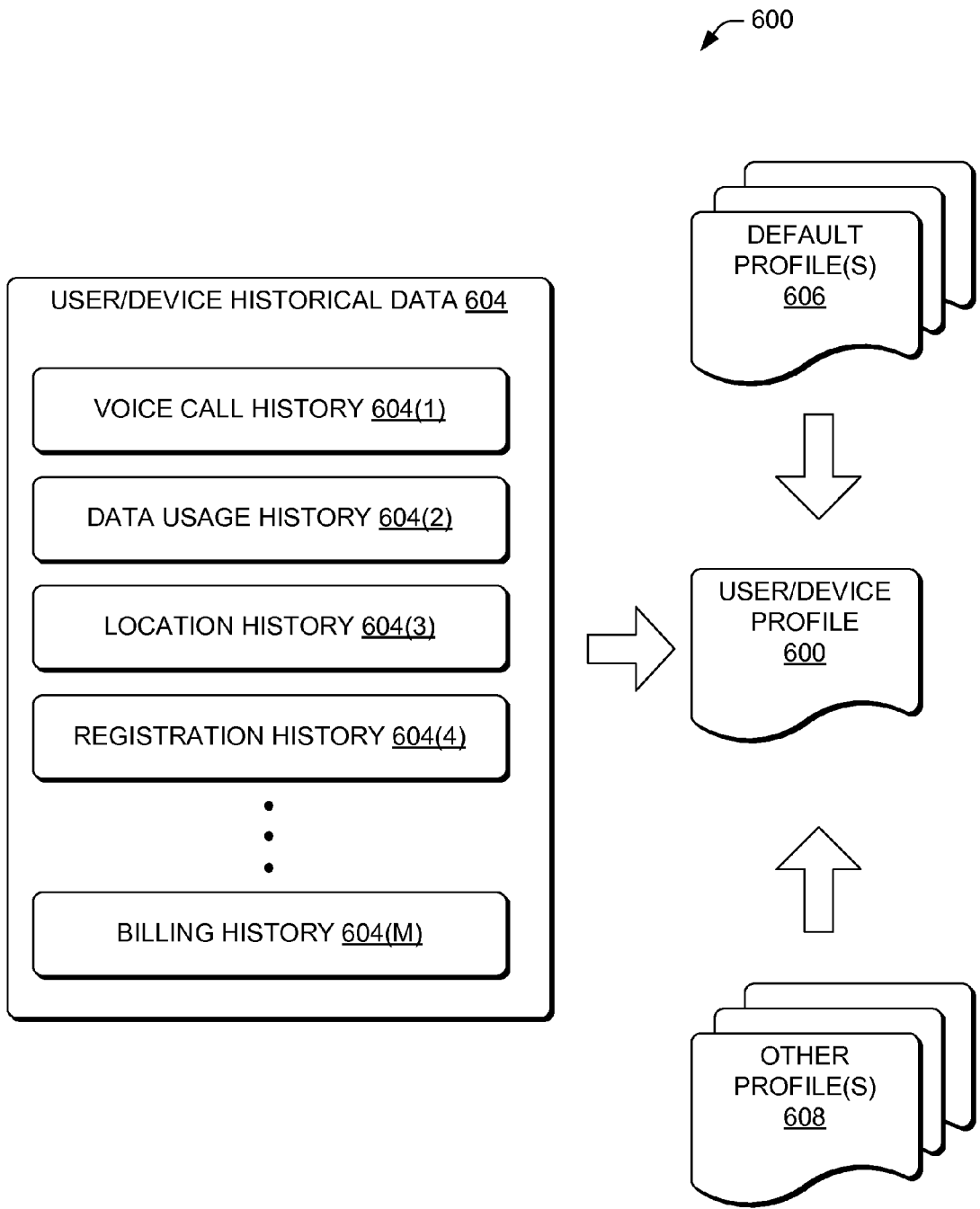
FIG. 6 is a block diagram showing an illustrative profile that is created, modified, or populated and then used to select a service provider. The profile may be populated using default information and/or historical information associated with a user and/or device.

FIG. 6 is a block diagram showing an illustrative profile 600 that is created, modified, and/or populated and then used to select a service provider. The profile 600 may be populated using default information and/or historical information associated with a user and/or device. In some embodiments, the profile 600 may be created, modified, and/or populated by the provisioning server 106.

The profile 600 may high level information or instructions that enable the provisioning server 106 to select a best service provider for the device 102. The profile 600 may include weights and/or scores for different criteria, such as cost, reliability, different services used, and so forth. The profile may also include historical information that may be used to predict future behavior. For example, the profile may include historical information about use by the device 102 and/or user 116. For example, information representative of historical use, which may include voice calls in various locations over time, data usage in various locations over time, and so forth. This data may indicate usage of the device in other regions that are different from a home/primary region. The information may be aggregated information that can be used to determine which service provider and/or which service options are best suited for a device/user when the device is relocated to a different region having different service providers. The profile may also store travel trends, such as an average length of stay when the device/user are traveling. In various embodiments, the profile may be populated with direct input of information (e.g., use preferences).

In accordance with one or more embodiments, the profile 600 may be populated at least partly using historical data 604 of the device and/or user. The historical data 604 may include one or more of voice call history 604(1), data usage history 604(2), location history 604(3), registration history 604(4), billing history 604(M), and/or other relevant historical data. The voice call history 604(1) may provide information about historical voice calls per time period, which may be used to predict future use. The data usage history 604(2) may provide information about historical data use per time period, which may be used to predict future use. The data use may also indicate data transmission speed, data consumed, when the data is consumed, and other relevant information to enable trend analysis of data use. The location history 604(3) may track use variations per location, such as when the device is used in different regions. The location history 604(3) may enable prediction of a length of stay at a location, the length of a vacation, and so forth. The registration history 604(4) may indicate prior service providers used by the network-enabled device, and possibly prior service plans used by the network-enabled device. The registration history 604(4) may be used to select comparable service providers and/or service plans, for example. The billing history 604(M) may provide plan selection preferences, cost information, and/or other usage information, which may be used to populate other historical data discussed above. The history information may be stored in one or more databases and used together and/or individually to populate the profile 600. For example, the profile module 230 may query the historical data 604 to generate aggregated information that reflects user preferences based on the historical data 604.

In some embodiments, the profile 600 may be associated with another user based on a likeness of the user 116 with another user. Similarly the profile may be associated with another device based at least partly on a likeness of the device 102 with another device (e.g., another smart phone that accesses a large amount of data, etc.). By creating these associations, information from default profiles 606 and/or other profiles 608 (associated with other users and/or devices) may be used to at least partially populate the profile 600 that is used for a specific device and/or for a specific user.

Figure 7:
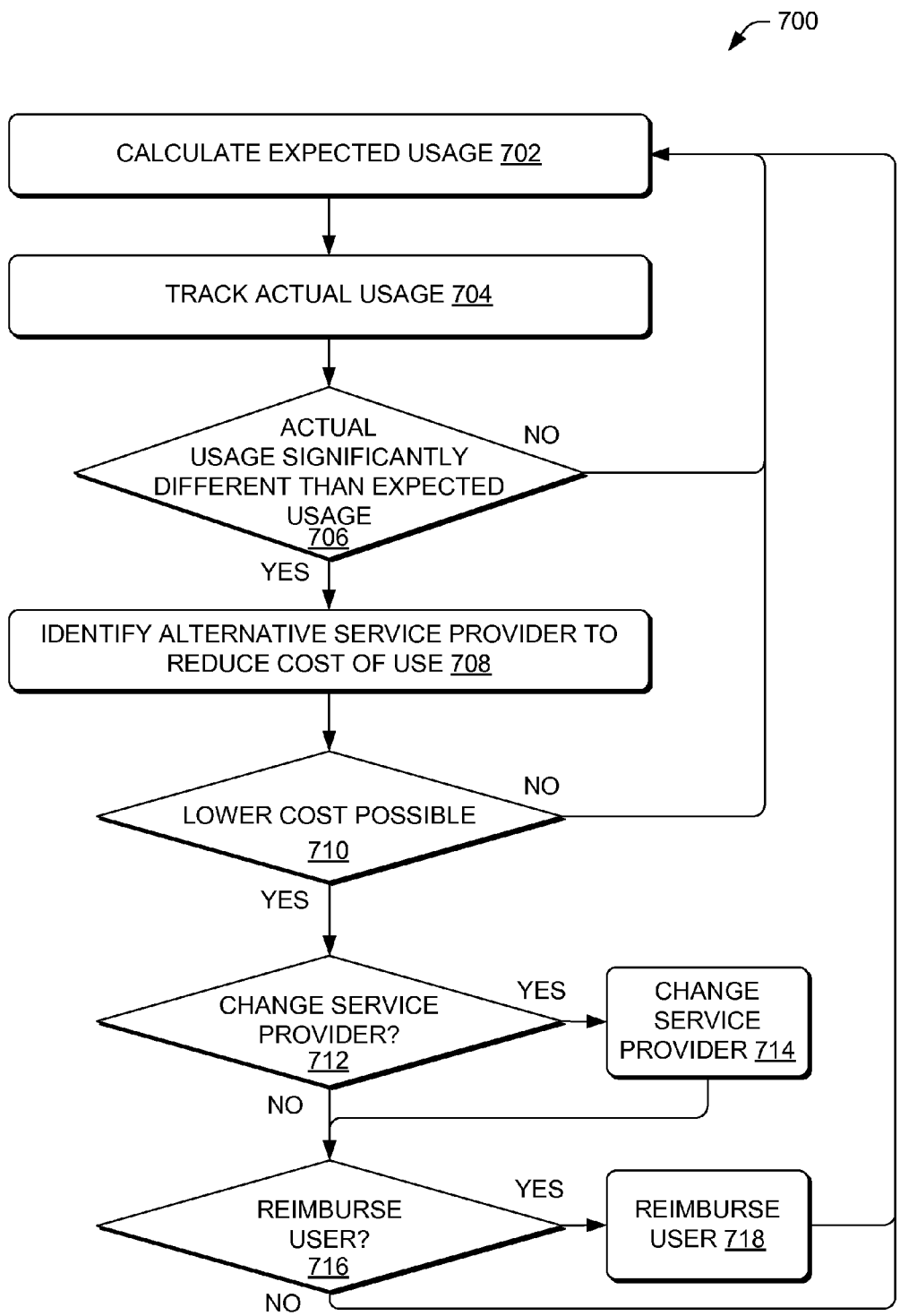
FIG. 7 is a flow diagram of an illustrative process to determine whether to make adjustments to a service plan and/or a reimbursement based on a comparison of expected usage of a device to actual usage of the device.

FIG. 7 is a flow diagram of an illustrative process 700 to determine whether to make adjustments to a service plan and/or a reimbursement based on a comparison of expected usage of a device to actual usage of the device. The process 700 is described with reference to the environment 100 and computing architectures shown in FIGS. 2A and 2B. The process 700 may be performed by the provisioning server 106. Although the process 700 focuses on cost, other criteria may be used singly or in combination, such as reliability, coverage, security, data speed, and so forth.

At 702, the usage module 234 may calculate an expected usage of the device 102 in a new region. For example, when the device 102 is detected as located in a new region, the usage module 234 may predict a duration of stay in the region and an expected amount of use per time period, possibly based on the profile 600 generated by the profile module 230. For example, the expected usage may be an amount of voice calls (e.g., minutes used, etc.) and/or data used (e.g., Mb used, etc.) each day as well as a number of days expected in the new region, which may be temporary location or a permanent new location.

At 704, the usage module 234 may track actual usage by the device 102. The actual usage may be accessed in real-time or non-real-time. For example, the actual use may be retrieved from billing information accessible to the provisioning server 106.

At 706, the usage module 234 may compare the expected usage to the actual usage to determine if a significant different exists between the expected usage and the actual usage for a same time period. A significant different be defined as a variable based on an algorithm used to compare the usage. When the usage module 234 determines that the actual usage is not significantly different than the expected usage (following the "no" route from the decision operation 706), then the process 700 may advance back to the operation 702 for possible continued processing, possibly after a delay.

When the usage module 234 determines that the actual usage is significantly different than the expected usage (following the "yes" route from the decision operation 706), then the process 700 may advance to an operation 708. At 708, the selection module 236 may determine alternative service providers and/or service options would or would have reduced costs of use of the device. For example, based on the actual use of the device, the selection module 236 may attempt to identify a cheaper service provider and/or service option (plan). However, other metrics in addition to cost or instead of cost may be used in these determinations, such as coverage, data speeds, reliability, and so forth. Thus, although the following operations discuss cost, the disclosure is not limited to use of cost in this analysis.

At 710, the selection module 236 may determine whether a service provider and/or service option can offer service to support the actual usage (and predicted future usage) at a lower cost. When the selection module 236 determines that no lower cost option is available (following the "no" route from the decision operation 710), then the process 700 may advance to the operation 702 for possible continued processing, possibly after a delay. When the selection module 236 determines that a lower cost option is available (following the "yes" route from the decision operation 710), then the process 700 may advance to a decision operation 712.

At 712, the selection module 236 may determine whether to change to a new service provider and/or a new service option that provides service at a lower cost and/or service better suited for the device 102 and/or the user 116. The new service provider and/or service option may be selected from those identified at the operation 708.

When the selection module 236 determines to change to a new service provider and/or service option (following the "yes" route from the decision operation 712), then the process 700 may advance to an operation 714 where the selection module 236 may implement the change (e.g., similar to the operations 316 and 318 discussed in the process 300). However, when only a service option needs to be changed, the change may be performed without changing or modifying content of the embedded SIM 208.

Following the operation 714, or when the selection module 236 determines not to change to a new service provider and/or service option (following the "no" route from the decision operation 712), the process 700 may advance to a decision operation 716. At 716, the selection module 236 may determine whether to provide a reimbursement or partial reimbursement to the user for the cost difference determined by the usage module 234. For example, the provisioning server 106 may allocate some funds to offset as least some costs incurred by a device/user from inaccurate predictions made by the selection module 236. For example, the provisioning server 106 may spread costs over a larger group of devices to offset costs associated with inaccurate predictions by way of use of reimbursements or partial reimbursements. Some funding for the reimbursements may be generated by volume discounts captured by the provisioning server 106 through the provisioning of service providers. When the selection module 236 determines to reimburse the device/user (following the "yes" route from the decision operation 716), then the process 700 may advance to an operation 718.

At 718, the payment module 240 may cause a payment to be made to a current or former service provider associated with the device, to an administrator of the device 102, and/or to the user 116 as the reimbursement or partial reimbursement. When the selection module 236 determines not to reimburse the device/user (following the "no" route from the decision operation 716), then the process 700 may advance to the operation 702 for possible continued processing, possibly after a delay.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   determining, from location information received from a network-enabled device, that the network-enabled device has been relocated from a first region to a second, different region, wherein at least one service provider that provides connectivity services to network-enabled devices is available in the second region and is unavailable in the first region;
   determining, by a provisioning device, service providers available to provide the connectivity services to network-enabled devices in the second region;
   determining, by the provisioning device, service plans offered by individual ones of the service providers;
   determining, by the provisioning device, a profile associated with the network-enabled device or a user of the network-enabled device, the profile providing at least historical usage information of the network-enabled device;
   selecting, by the provisioning device and for the network-enabled device, based at least in part on the at least historical usage information associated with the profile, (i) a new service provider from the service providers and (ii) a new service plan from the service plans for the network-enabled device;

storing a first regional profile of the network-enabled device, the first regional profile associated with the first region and including a configuration of the network-enabled device in the first region for use upon return of the network-enabled device to the first region; and transmitting, by the provisioning device, a message to the network-enabled device to cause an electronic update to an embedded Subscriber Identifier Module (SIM) of the network-enabled device, the update of the embedded SIM to enable identification of the network-enabled device by the new service provider that implements the new service plan, the update occurring without user input by a user of the network-enabled device and without physical interaction with the network-enabled device.

2. The method as recited in claim 1, wherein the selecting is further based at least in part on coverage metrics and reliability metrics associated with the service providers.

3. The method as recited in claim 1, wherein the network-enabled device is a non-user-facing deployed device.

4. The method as recited in claim 1, wherein the selecting the service plan is performed to support continued data usage of the network-enabled device that is consistent with the historical usage information.

5. The method as recited in claim 1, wherein the first region is associated with a first country and the second region is associated with a second, different country.

6. The method as recited in claim 1, wherein the location information received from the network-enabled device is at least one of global positioning system (GPS) data or a mobile network identification associated with the second region.

7. The method as recited in claim 1, further comprising determining an expected usage of the network-enabled device in the second region, and wherein the selecting the new service provider is based at least in part on the expected usage in the second region.

8. The method as recited in claim 7, further comprising:
determining actual usage of the network-enabled device in the second region; and
selecting, for the network-enabled device, based at least in part on the profile and the actual usage, (i) another new service provider from the service providers or (ii) another new service plan from the service plans for the network-enabled device.

9. The method as recited in claim 1, wherein the profile includes one or more weights associated with at least one of data usage, voice call usage, service provider reliability, security, or service provider coverage, and wherein the weights facilitate selection of the new service provider.

10. The method as recited in claim 1, further comprising:
determining, from location information received from the network-enabled device, that the network-enabled device has been relocated to the first region; and
transmitting another message to the network-enabled device to cause update to the embedded SIM of the network-enabled device to enable identification of the network-enabled device by a previous service provider that provided communications services to the network-enabled device in the first region.

11. The method as recited in claim 1, further including storing a second regional profile of the network-enabled device, the second regional profile associated with the second region and including a configuration of the network-enabled device in the second region, the configuration including at least the electronic update to the embedded SIM of the network-enabled device, the network-enabled device configured to apply the second regional profile when the network-enabled device is determined to be located in the second region.

12. A computer-implemented method comprising
determining, by a provisioning device, from location information received from a network-enabled device, that the network-enabled device has been relocated from a first region to a second, different region;
identifying, by the provisioning device, a first service provider offering a first service plan for use by the network-enabled device in the second region;
identifying, by the provisioning device, a second service provider offering a second service plan for use by the network-enabled device in the second region;
determining, by the provisioning device, a profile associated with the network-enabled device, the profile providing at least a historical usage information of the network-enabled device in at least the first region;
selecting, by the provisioning device, the first service provider based at least in part on the profile;
storing the profile as a first regional profile of the network-enabled device, the first regional profile associated with the first region and including a configuration of the network-enabled device in the first region for use upon return of the network-enabled device to the first region; and
causing, by the provisioning device, update to an embedded Subscriber Identifier Module (SIM) of the network-enabled device, the update of the embedded SIM to enable identification of the network-enabled device by the first service provider that implements the first service plan.

13. The method as recited in claim 12, wherein the selecting is performed to support continued usage of the network-enabled device that is consistent with the historical usage information.

14. The method as recited in claim 12, wherein the network-enabled device is at least one of a billing device or a tracking device.

15. The method as recited in claim 12, wherein the location information received from the network-enabled device comprises global positioning system (GPS) data.

16. The method as recited in claim 12, further comprising determining an expected usage of the network-enabled device in the second region, and wherein the selecting the first service provider is based at least in part on the expected usage in the second region.

17. The method as recited in claim 12, wherein the profile includes one or more weights associated with at least one of data usage, voice call usage, service provider reliability, or service provider coverage, wherein the weights facilitate selection of the new service provider.

18. A system comprising:
one or more processors; and
memory to store computer-executable instructions that, when executed, cause the one or more processors to:
determine, from location information received from a network-enabled device, that the network-enabled device has been relocated from a first region to a second, different region;
identify a first service provider offering a first plurality of service plans for use by the network-enabled device in the second region;
identify a second service provider offering a second plurality of service plans for use by the network-enabled device in the second region;

determine a profile associated with the network-enabled device, the profile providing at least historical usage information of the network-enabled device in at least the first region;

select the first service provider and a selected service plan of the first plurality of service plans based at least in part on the profile;

storing the profile as a first regional profile of the network-enabled device, the first regional profile associated with the first region and including a configuration of the network-enabled device in the first region for use upon return of the network-enabled device to the first region; and cause update to an embedded Subscriber Identifier Module (SIM) of the network-enabled device, the update of the embedded SIM to enable identification of the network-enabled device by the first service provider that implements the selected service plan.

19. The system as recited in claim 18, wherein the selecting the selected service plan is performed to support continued usage of the network-enabled device that is consistent with the historical usage information.

20. The system as recited in claim 18, wherein the computer-executable instructions cause the one or more processors to determine an expected usage of the network-enabled device in the second region, and wherein the selecting the first service provider is based at least in part on the expected usage in the second region.

* * * * *